United States Patent [19]

Kitado

[11] 4,400,791
[45] Aug. 23, 1983

[54] DOT MATRIX PRINTER WITH COMPRESSED CHARACTER DATA STORAGE

[75] Inventor: Haruo Kitado, Shiojiri, Japan

[73] Assignee: Epson Corporation, Nagano, Japan

[21] Appl. No.: 195,229

[22] Filed: Oct. 8, 1980

[30] Foreign Application Priority Data

Oct. 9, 1979 [JP] Japan ............................. 54/130463

[51] Int. Cl.³ .............................................. G06F 3/12
[52] U.S. Cl. ................................... 364/900; 178/30; 340/728
[58] Field of Search ... 364/200 MS File, 900 MS File; 178/15, 30; 340/728; 400/124; 101/93.04, 93.05

[56] References Cited

U.S. PATENT DOCUMENTS

3,774,161 11/1973 Chambers .................... 340/728 X
3,990,559 11/1976 Martin et al. ................... 178/30 X Primary Examiner—Raulfe B. Zache
Attorney, Agent, or Firm—Blum, Kaplan, Friedman, Silberman & Beran

[57] ABSTRACT

A method and apparatus for performing dot matrix printing in which the storage capacity of a memory used for storing character patterns is significantly reduced and the accompanying decoding process is quite simple. Character patterns to be printed are coded in patterns of normal and half-shifted dots, and data representing both types of dots is stored in a read only memory. Half-shift instructions are stored in the memory to identify which dots are to be printed at half-shifted positions located between adjacent columns in a matrix used as a reference from which the character pattern is encoded. Several half-shift instructions are stored for each row with each instruction corresponding to a plurality of adjacent dot locations in the associated row. In reading out data from the memory, each half-shift instruction is effective until the location of the next half-shift instruction is reached. In a preferred embodiment, the character patterns are encoded so that the memory can be read bi-directionally, printing in two directions.

24 Claims, 10 Drawing Figures

COLUMNS

| | $b_{15}$ | $b_{14}$ | $b_{13}$ | $b_{12}$ | $b_{11}$ | $b_{10}$ | $b_9$ | $b_8$ | $b_7$ | $b_6$ | $b_5$ | $b_4$ | $b_3$ | $b_2$ | $b_1$ | $b_0$ | |
|---|---|---|---|---|---|---|---|---|---|---|---|---|---|---|---|---|---|
| ($\alpha_M$) | 0 | 0 | 0 | 0 | 0 | 0 | 0 | 0 | 0 | 0 | 0 | 0 | 0 | 0 | 0 | 0 | $C_1$ |
| ($\alpha_M+1$) | 1 | 1 | 1 | 0 | 1 | 1 | 1 | 1 | 1 | 1 | 1 | 1 | 1 | 0 | 0 | 0 | $R_1$ |
| ($\alpha_M+2$) | 0 | 1 | 1 | 0 | 0 | 0 | 0 | 0 | 0 | 0 | 0 | 0 | 0 | 0 | 1 | 1 | $C_2$ |
| ($\alpha_M+3$) | 0 | 1 | 1 | 0 | 0 | 0 | 0 | 0 | 0 | 0 | 0 | 0 | 0 | 0 | 1 | 1 | $C_3$ |
| ($\alpha_M+4$) | 0 | 1 | 1 | 1 | 1 | 1 | 1 | 1 | 1 | 1 | 1 | 1 | 1 | 1 | 1 | 1 | $C_4$ |
| ($\alpha_M+5$) | 0 | 1 | 1 | 1 | 1 | 1 | 1 | 1 | 1 | 1 | 1 | 1 | 1 | 1 | 1 | 1 | $C_5$ |
| ($\alpha_M+6$) | 0 | 1 | 1 | 1 | 0 | 0 | 0 | 0 | 0 | 0 | 0 | 0 | 1 | 1 | 1 | 1 | $C_6$ |
| ($\alpha_M+7$) | 1 | 1 | 1 | 0 | 1 | 0 | 1 | 0 | 1 | 0 | 1 | 0 | 1 | 0 | 0 | 0 | $R_2$ |
| ($\alpha_M+8$) | 0 | 1 | 1 | 1 | 1 | 1 | 1 | 0 | 0 | 0 | 0 | 0 | 0 | 0 | 1 | 1 | $C_7$ |
| ($\alpha_M+9$) | 0 | 0 | 0 | 1 | 1 | 1 | 1 | 1 | 1 | 0 | 0 | 0 | 0 | 0 | 0 | 0 | $C_8$ |
| ($\alpha_M+10$) | 0 | 0 | 0 | 0 | 0 | 1 | 1 | 1 | 1 | 1 | 1 | 0 | 0 | 0 | 0 | 0 | $C_9$ |
| ($\alpha_M+11$) | 0 | 0 | 0 | 0 | 0 | 0 | 0 | 1 | 1 | 1 | 1 | 1 | 1 | 0 | 0 | 0 | $C_{10}$ |
| ($\alpha_M+12$) | 1 | 1 | 1 | 0 | 1 | 0 | 1 | 0 | 1 | 0 | 1 | 0 | 1 | 0 | 1 | 0 | $R_3$ |
| ($\alpha_M+13$) | 0 | 0 | 0 | 0 | 0 | 0 | 0 | 0 | 1 | 1 | 1 | 1 | 1 | 1 | 1 | 0 | $C_{11}$ |
| ($\alpha_M+14$) | 0 | 0 | 0 | 0 | 0 | 0 | 0 | 0 | 0 | 0 | 1 | 1 | 1 | 1 | 1 | 1 | $C_{12}$ |
| ($\alpha_M+15$) | 0 | 0 | 0 | 0 | 0 | 0 | 0 | 0 | 0 | 1 | 1 | 1 | 1 | 1 | 0 | 0 | $C_{13}$ |
| ($\alpha_M+16$) | 0 | 0 | 0 | 0 | 0 | 0 | 0 | 1 | 1 | 1 | 1 | 0 | 0 | 0 | 0 | 0 | $C_{14}$ |
| ($\alpha_M+17$) | 0 | 0 | 0 | 0 | 0 | 1 | 1 | 1 | 1 | 0 | 0 | 0 | 0 | 0 | 0 | 0 | $C_{15}$ |
| ($\alpha_M+18$) | 1 | 1 | 1 | 0 | 1 | 0 | 1 | 0 | 1 | 0 | 1 | 0 | 1 | 0 | 0 | 0 | $R_4$ |
| ($\alpha_M+19$) | 0 | 0 | 0 | 0 | 1 | 1 | 1 | 1 | 0 | 0 | 0 | 0 | 0 | 0 | 1 | 1 | $C_{16}$ |
| ($\alpha_M+20$) | 0 | 1 | 1 | 1 | 1 | 1 | 0 | 0 | 0 | 0 | 0 | 0 | 0 | 0 | 1 | 1 | $C_{17}$ |
| ($\alpha_M+21$) | 1 | 1 | 1 | 0 | 1 | 1 | 1 | 1 | 1 | 1 | 1 | 1 | 0 | 0 | 0 | 0 | $R_5$ |
| ($\alpha_M+22$) | 0 | 1 | 1 | 1 | 1 | 1 | 1 | 1 | 1 | 1 | 1 | 1 | 1 | 1 | 1 | 1 | $C_{18}$ |
| ($\alpha_M+23$) | 0 | 1 | 1 | 1 | 1 | 1 | 1 | 1 | 1 | 1 | 1 | 1 | 1 | 1 | 1 | 1 | $C_{19}$ |
| ($\alpha_M+24$) | 0 | 1 | 1 | 1 | 1 | 1 | 1 | 1 | 1 | 1 | 1 | 1 | 1 | 1 | 1 | 1 | $C_{20}$ |
| ($\alpha_M+25$) | 0 | 1 | 1 | 1 | 0 | 0 | 0 | 0 | 0 | 0 | 0 | 0 | 1 | 1 | 1 | 1 | $C_{21}$ |
| ($\alpha_M+26$) | 0 | 1 | 1 | 0 | 0 | 0 | 0 | 0 | 0 | 0 | 0 | 0 | 0 | 0 | 1 | 1 | $C_{22}$ |
| ($\alpha_M+27$) | 0 | 0 | 0 | 0 | 0 | 0 | 0 | 0 | 0 | 0 | 0 | 0 | 0 | 0 | 1 | 1 | $C_{23}$ |
| ($\alpha_M+28$) | 0 | 0 | 0 | 0 | 0 | 0 | 0 | 0 | 0 | 0 | 0 | 0 | 0 | 0 | 0 | 0 | $C_{24}$ |

ROWS (ADDRESSES)

COLUMNS

| | $b_{15}$ | $b_{14}$ | $b_{13}$ | $b_{12}$ | $b_{11}$ | $b_{10}$ | $b_9$ | $b_8$ | $b_7$ | $b_6$ | $b_5$ | $b_4$ | $b_3$ | $b_2$ | $b_1$ | $b_0$ | |
|---|---|---|---|---|---|---|---|---|---|---|---|---|---|---|---|---|---|
| $(\alpha_M + )$ | 0 | 0 | 0 | 0 | 0 | 0 | 0 | 0 | 0 | 0 | 0 | 0 | 0 | 0 | 0 | 0 | $C_1$ |
| $(\alpha_M + 1)$ | 1 | 1 | 1 | 0 | 1 | 1 | 1 | 1 | 1 | 1 | 1 | 1 | 0 | 0 | 0 | 0 | $\ell'_7$ |
| $(\alpha_M + 2)$ | 0 | 1 | 1 | 0 | 0 | 0 | 0 | 0 | 0 | 0 | 0 | 0 | 0 | 0 | 1 | 1 | $C_2$ |
| $(\alpha_M + 3)$ | 0 | 1 | 1 | 0 | 0 | 0 | 0 | 0 | 0 | 0 | 0 | 0 | 0 | 0 | 1 | 1 | $C_3$ |
| $(\alpha_M + 4)$ | 0 | 1 | 1 | 1 | 1 | 1 | 1 | 1 | 1 | 1 | 1 | 1 | 1 | 1 | 1 | 1 | $C_4$ |
| $(\alpha_M + 5)$ | 0 | 1 | 1 | 1 | 1 | 1 | 1 | 1 | 1 | 1 | 1 | 1 | 1 | 1 | 1 | 1 | $C_5$ |
| $(\alpha_M + 6)$ | 0 | 1 | 1 | 1 | 1 | 0 | 0 | 0 | 0 | 0 | 0 | 0 | 1 | 1 | 1 | 1 | $C_6$ |
| $(\alpha_M + 7)$ | 1 | 0 | 0 | 1 | 0 | 0 | 0 | 0 | 0 | 0 | 0 | 0 | 0 | 1 | 1 | 1 | $\ell'_5$ |
| $(\alpha_M + 8)$ | 1 | 1 | 1 | 0 | 1 | 0 | 1 | 0 | 1 | 0 | 1 | 0 | 1 | 0 | 0 | 0 | $\ell_2$ |
| $(\alpha_M + 9)$ | 0 | 1 | 1 | 1 | 1 | 1 | 1 | 0 | 0 | 0 | 0 | 0 | 0 | 0 | 1 | 1 | $C_7$ |
| $(\alpha_M + 10)$ | 0 | 0 | 0 | 1 | 1 | 1 | 1 | 1 | 1 | 0 | 0 | 0 | 0 | 0 | 0 | 0 | $C_8$ |
| $(\alpha_M + 11)$ | 0 | 0 | 0 | 0 | 0 | 1 | 1 | 1 | 1 | 1 | 0 | 0 | 0 | 0 | 0 | 0 | $C_9$ |
| $(\alpha_M + 12)$ | 0 | 0 | 0 | 0 | 0 | 0 | 0 | 1 | 1 | 1 | 1 | 1 | 1 | 0 | 0 | 0 | $C_{10}$ |
| $(\alpha_M + 13)$ | 1 | 0 | 0 | 1 | 0 | 1 | 0 | 1 | 0 | 1 | 0 | 1 | 0 | 1 | 1 | 1 | $\ell'_4$ |
| $(\alpha_M + 14)$ | 1 | 1 | 1 | 0 | 1 | 0 | 1 | 0 | 1 | 0 | 1 | 0 | 1 | 0 | 1 | 0 | $\ell_3$ |
| $(\alpha_M + 15)$ | 0 | 0 | 0 | 0 | 0 | 0 | 0 | 0 | 1 | 1 | 1 | 1 | 1 | 1 | 1 | 0 | $C_{11}$ |
| $(\alpha_M + 16)$ | 0 | 0 | 0 | 0 | 0 | 0 | 0 | 0 | 0 | 1 | 1 | 1 | 1 | 1 | 1 | 1 | $C_{12}$ |
| $(\alpha_M + 17)$ | 0 | 0 | 0 | 0 | 0 | 0 | 0 | 0 | 1 | 1 | 1 | 1 | 1 | 0 | 0 | 0 | $C_{13}$ |
| $(\alpha_M + 18)$ | 0 | 0 | 0 | 0 | 0 | 0 | 0 | 1 | 1 | 1 | 1 | 0 | 0 | 0 | 0 | 0 | $C_{14}$ |
| $(\alpha_M + 19)$ | 0 | 0 | 0 | 0 | 0 | 1 | 1 | 1 | 1 | 0 | 0 | 0 | 0 | 0 | 0 | 0 | $C_{15}$ |
| $(\alpha_M + 20)$ | 1 | 0 | 0 | 1 | 0 | 1 | 0 | 1 | 0 | 1 | 0 | 1 | 0 | 1 | 0 | 1 | $\ell'_3$ |
| $(\alpha_M + 21)$ | 1 | 1 | 1 | 0 | 1 | 0 | 1 | 0 | 1 | 0 | 1 | 0 | 1 | 0 | 0 | 0 | $\ell_4$ |
| $(\alpha_M + 22)$ | 0 | 0 | 0 | 0 | 1 | 1 | 1 | 1 | 0 | 0 | 0 | 0 | 0 | 0 | 1 | 1 | $C_{16}$ |
| $(\alpha_M + 23)$ | 0 | 1 | 1 | 1 | 1 | 1 | 0 | 0 | 0 | 0 | 0 | 0 | 0 | 0 | 1 | 1 | $C_{17}$ |
| $(\alpha_M + 24)$ | 1 | 0 | 0 | 1 | 0 | 1 | 0 | 1 | 0 | 1 | 0 | 1 | 0 | 1 | 1 | 1 | $\ell'_2$ |
| $(\alpha_M + 25)$ | 1 | 1 | 1 | 0 | 1 | 1 | 1 | 1 | 1 | 1 | 1 | 1 | 0 | 0 | 0 | 0 | $\ell_5$ |
| $(\alpha_M + 26)$ | 0 | 1 | 1 | 1 | 1 | 1 | 1 | 1 | 1 | 1 | 1 | 1 | 1 | 1 | 1 | 1 | $C_{18}$ |
| $(\alpha_M + 27)$ | 0 | 1 | 1 | 1 | 1 | 1 | 1 | 1 | 1 | 1 | 1 | 1 | 1 | 1 | 1 | 1 | $C_{19}$ |
| $(\alpha_M + 28)$ | 0 | 1 | 1 | 1 | 1 | 1 | 1 | 1 | 1 | 1 | 1 | 1 | 1 | 1 | 1 | 1 | $C_{20}$ |
| $(\alpha_M + 29)$ | 0 | 1 | 1 | 1 | 0 | 0 | 0 | 0 | 0 | 0 | 0 | 0 | 0 | 1 | 1 | 1 | $C_{21}$ |
| $(\alpha_M + 30)$ | 0 | 1 | 1 | 0 | 0 | 0 | 0 | 0 | 0 | 0 | 0 | 0 | 0 | 0 | 1 | 1 | $C_{22}$ |
| $(\alpha_M + 31)$ | 1 | 0 | 0 | 1 | 0 | 0 | 0 | 0 | 0 | 0 | 0 | 0 | 0 | 1 | 1 | 1 | $\ell'_1$ |
| $(\alpha_M + 32)$ | 0 | 0 | 0 | 0 | 0 | 0 | 0 | 0 | 0 | 0 | 0 | 0 | 0 | 0 | 1 | 1 | $C_{23}$ |
| $(\alpha_M + 33)$ | 0 | 0 | 0 | 0 | 0 | 0 | 0 | 0 | 0 | 0 | 0 | 0 | 0 | 0 | 0 | 0 | $C_{24}$ |

ROWS (ADDRESSES)

DOT MATRIX PRINTER WITH COMPRESSED CHARACTER DATA STORAGE

BACKGROUND OF THE INVENTION

The present invention relates to methods and apparatus for performing dot matrix printing and more particularly to methods and apparatus for computerized printing using prestored character data having reduced memory storage capacity.

Dot matrix methods for printing characters, numerals, and the like are advantageous, compared with printing methods using font, that is, individual pre-set character elements, in that the character patterns printed can be assembled using software, that is, programmed operations on stored data. Moreover, the printing of enlarged, reduced or italicized characters can be easily formed. Accordingly, dot matrix methods are quite flexible and have found wide application. On the other hand, since characters are formed with a limited number of dots, curved or oblique lines are apt to be distorted thereby reducing the character resolution. In order to eliminate this problem, it has been the practice to proportionally increase the number of dots and hence the capacity of memories used to store the character patterns.

Many methods to restrict this increase in the number of dots and related memory size have been proposed. These methods can be classified into two groups. With the methods of the first group, a portion of the dots which make up the characters are generated operationally to thereby avoid a need for a portion of the memory capacity. With the methods of the second group, each character pattern is divided into a plurality of subpatterns and the number of bits in the pattern is determined according to the frequency of identical subpatterns which are used.

Although the first group of methods is advantageous in that the capacity of the memory which stores the character patterns does not increase, the operational process required for implementation of the method is often complicated and it is impossible to always reproduce accurate characters.

As to the second group of methods, there is some advantage as to the needed memory storage brought about by divisions into appropriate subpatterns. However, the savings in memory storage capacity obtainable with the methods of the second group are at most 20–30% and the accompanying process needed for character decoding is complicated and time consuming.

What is needed is a method and apparatus for dot printing which relies on compressed data for an entire character, thereby avoiding both special operations and sub-patterns decoding to print a character having a large number of dots.

SUMMARY OF THE INVENTION

Generally speaking, in accordance with this invention, a method and apparatus especially suitable for dot matrix printing is provided. Therein, all character patterns are coded relative to a fixed matrix of rows and columns in patterns of "normal" dots and "half-shifted" dots. Data representing both types of dots is stored in a memory. As used herein, a "half-shifted" dot is a dot which is shifted by one-half the distance in the printing direction between adjacent dots which are in "normal" dot positions. A "deformed" character pattern is one in which half shifts of the dots which must be shifted to generate the desired pattern have not yet been performed. Half-shift instructions are stored for each matrix row to specify which dots in the row are half-shifted dots. When a row of dots has the same patterns of shifting as in the preceding column, the half-shift instructions form the previous column are used. The deformed character pattern, which is the pattern actually stored in the memory, and the half-shift instructions are operationally processed to restore the character pattern. Special bits are used as code bits to distinguish between deformed character pattern data and half-shift instructions which are stored together in a single memory.

Accordingly, it is an object of this invention to provide an improved dot matrix printing method and apparatus in which the storage capacity of a memory used for storing character patterns is minimized and the accompanying decoding process is simple.

Another object of this invention is to provide an improved method and apparatus for dot matrix printing wherein each character has character pattern data stored all in memory.

A further object of this invention is to provide an improved method and apparatus for dot matrix printing whereby dots are interspersed between the normal columns of the matrix, whereby high quality characters are produced having smooth edged sloping lines and curves.

Still another object of this invention is to provide an improved method and apparatus for dot matrix printing, wherein instruction data is applicable to a plurality of successive columns in the matrix.

Yet another object of this invention is to provide an improved method and apparatus for dot matrix printing, wherein character data is stored in a compressed format of rows and columns, and printing is accomplished in rows, columns and spaces between columns.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings in which:

FIG. 2a is a diagram showing a "deformed" capital letter M comprising dots only in normal dot positions on the matrix of FIG. 1.

FIG. 6 is table specifying data bits stored in a memory including dot position data and shift instructions corresponding to the patterns of FIGS. 2a, 2b and 2c;

DESCRIPTION OF THE PREFERRED EMBODIMENTS

The present invention is explained using a capital letter "M" as an example. "M" is appropriate for explanatory purposes because the letter has simple oblique lines as well as vertical lines.

Figure 1:
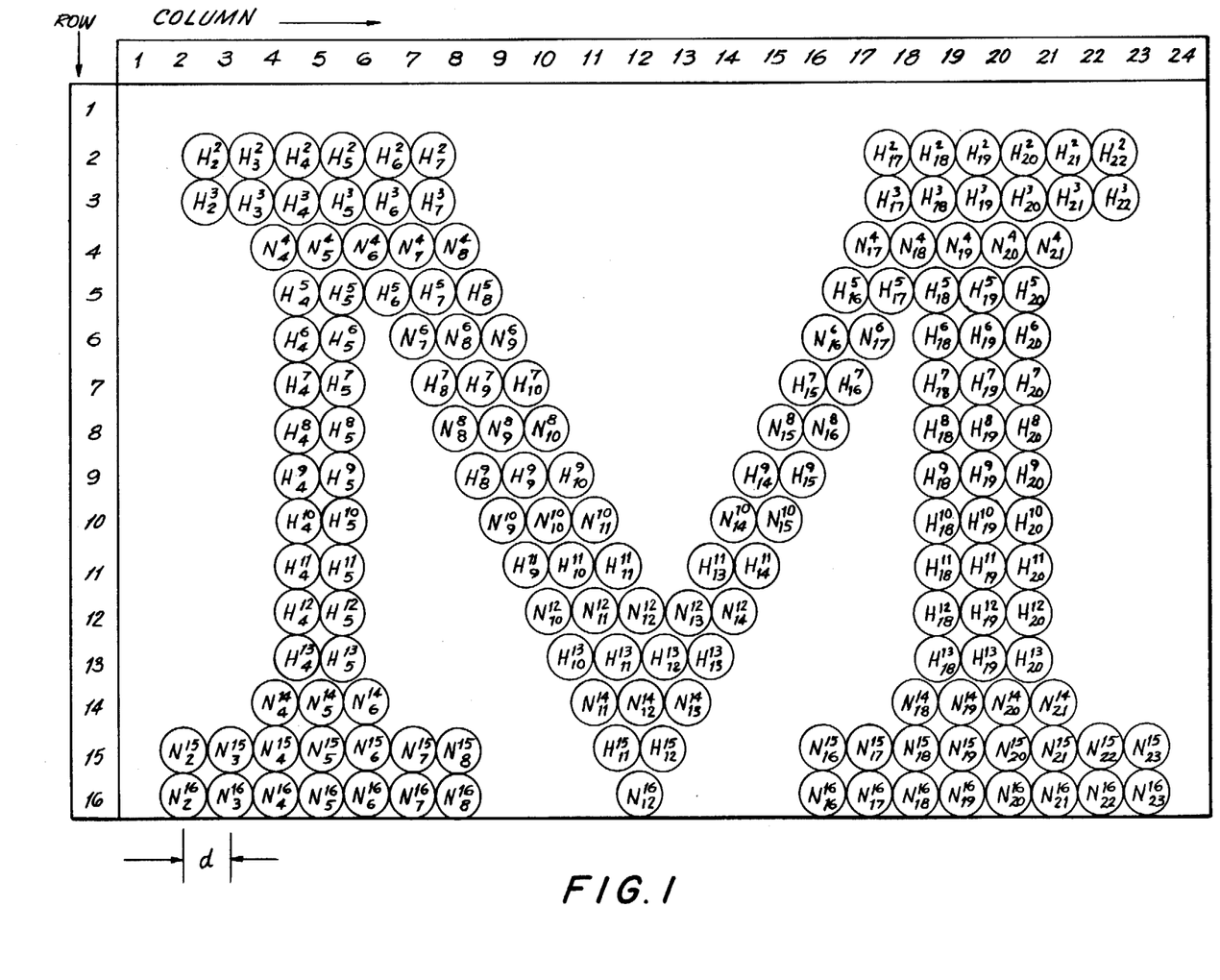
FIG. 1 is a diagram to an enlarged scale showing a capital letter M on a matrix of rows and columns and comprising a preferred combination of normal dots and half-shifted dots in accordance with the invention.

FIG. 1 shows the letter "M" as it is desired to be ultimately printed. The letter is composed of normal dots and half-shifted dots with the normal dot positions being assigned on the basis of a 16×24 matrix, and half-shifted dot positions being assigned on the basis of a 16×23 matrix. Circles in FIG. 1 denote locations, to an enlarged scale, where dots are to be printed. The letter N in a circle denotes a normal dot and H denotes a half-shifted dot. The superscript and subscript in each circle denote the row number and the column number, respectively. For example, $H_4^2$ denotes a half-shifted dot in the position of a second row and a fourth half-shifted dot column. The fourth half-shifted dot column is disposed between the fourth and fifth normal dot columns. In other words, the fourth half-shifted dot column is at the position of the fourth normal dot column but shifted rightwardly by d/2, where d is the distance between centers of adjacent normal dot columns.

According to the present invention, the pattern in FIG. 1 is obtained by processing information derived from a dot pattern as shown in FIG. 2a. The same 16×24 matrix is used in FIG. 2a as in FIG. 1. FIG. 2a is composed entirely of normal dots, that is, all dots are positioned directly in a column. Even the dots identified with an H are not located between columns but directly in a column. Thus, FIG. 2a shows a deformed M pattern as compared with FIG. 1 in that the V-shaped portion does not have smooth sides and the side portions are distorted.

Figure 2B:
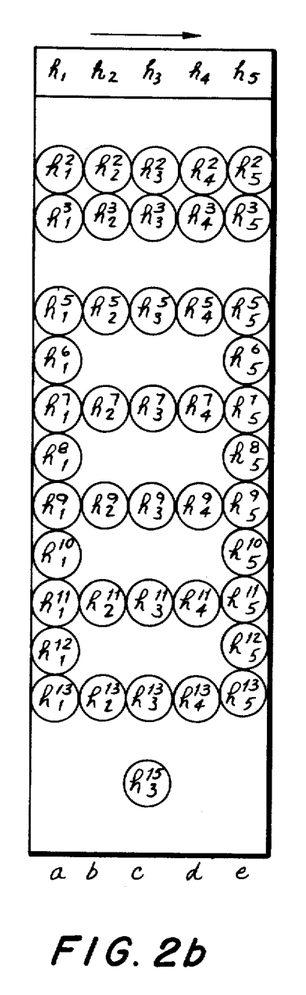
FIG. 2b is a diagram showing half-shift instructions operating on the dot pattern in FIG. 2a, to form the capital letter M in FIg. 1 in accordance with the present invention.

As explained more fully hereinafter, by processing information from an instruction pattern as shown in FIG. 2b, and operating on information from a deformed pattern as shown in FIG. 2a, the normal letter M as shown in FIG. 1 is produced.

To form the letter M in FIG. 1 on the basis of the deformed pattern in FIG. 2a, it is necessary when printing the dots to shift each of the dots which are designated in the instruction pattern as half-shifted dots rightwardly by d/2. Half-shift instructions $h_1$–$h_5$ are necessary at five columns, as shown in FIG. 2b, and explained more fully hereinafter to perform the required dot shifting for the letter M. To accomplish this half-shift, instructions $h_1$–$h_5$ are inserted into column positions identified as a to e, respectively and shown on the upper edge of FIG. 2a. For example, the $h_2$ signals of FIG. 2b are inserted between columns 6 and 7 in FIGS. 2a. However, for purposes of clarity in explanation, the shift instructions are shown separately in FIG. 2b. It should be understood that printing as first described herein is from left to right. The dots in each column of half-shifted columns are printed substantially simultaneously. Each instruction is effective until the next half-shift instruction is reached along a row. That is, the instruction $h_i^j$ designates that the j-th character dot in the i-th row in FIG. 2a is a half-shifted dot, as are the dots which follow in the same row up to a column which contains a subsequent half-shift instruction.

For example, in the second row in FIG. 2a, the half-shift instructions $h_1$–$h_5$ at inter-column positions a-e respectively, are used for the letter M as shown in FIG. 2b. Thus, in the dot pattern of FIG. 2a, the dots $H_2^2$ to $H_6^2$ are shifted by d/2 rightwardly from the normal column position in response to the half-shift instruction $h_1^2$ applied at a. The dot $H_7^2$ is shifted by d/2 in response to the half-shift instruction $h_2^2$ applied at b. The dot $H_{17}^2$ is shifted by d/2 rightwardly in response to the instructions $h_4^2$ applied at d, and the dots $H_{18}^2$ to $H_{22}^2$ are shifted by d/2 rightwardly in response to the instruction $h_5^2$ applied at e. In the second row the half-shift instruction $h_3^2$ applied at c has no effect because there are no dots between c and d.

As may be clearly seen, all of the printed dots in the second row are half-shifted dots. This is true also for the third row. In the fourth row there are no half-shift instructions (FIG. 2b). Therefore, the normal dots $N_4^4$ to $N_8^4$ and $N_{17}^4$ to $N_{21}^4$ are maintained as they are, on-column. In the fifth row, there are dot shift instructions ($h_1^5$ to $h_5^5$) in each of the inter-column positions a to e. Therefore, each of the dots in each of the columns in the fifth row is shifted rightwardly a distance d/2. As to the sixth line, the half-shift instructions $h_1^6$ and $h_5^6$ are present in inter-column positions a and e. Therefore, only the dots $H_4^6$ and $H_5^6$ and $H_{18}^6$ to $H_{20}^6$ are shifted rightwardly by d/2. Other dots in row 6 are printed in the normal, on-column positions. Continuing on through the matrix row by row and column by column the letter M as shown in FIG. 1 is formed from the data of FIGS. 2a and 2b.

As stated above, the information in FIGS. 2a and 2b is stored in a matrix memory which is a read only memory holding data for a character. It is noted that the capacity of the memory needed for storing the data from FIGS. 2a and 2b is considerably smaller than the capacity which would be required to store the pattern of FIG. 1 directly.

Figure 3:
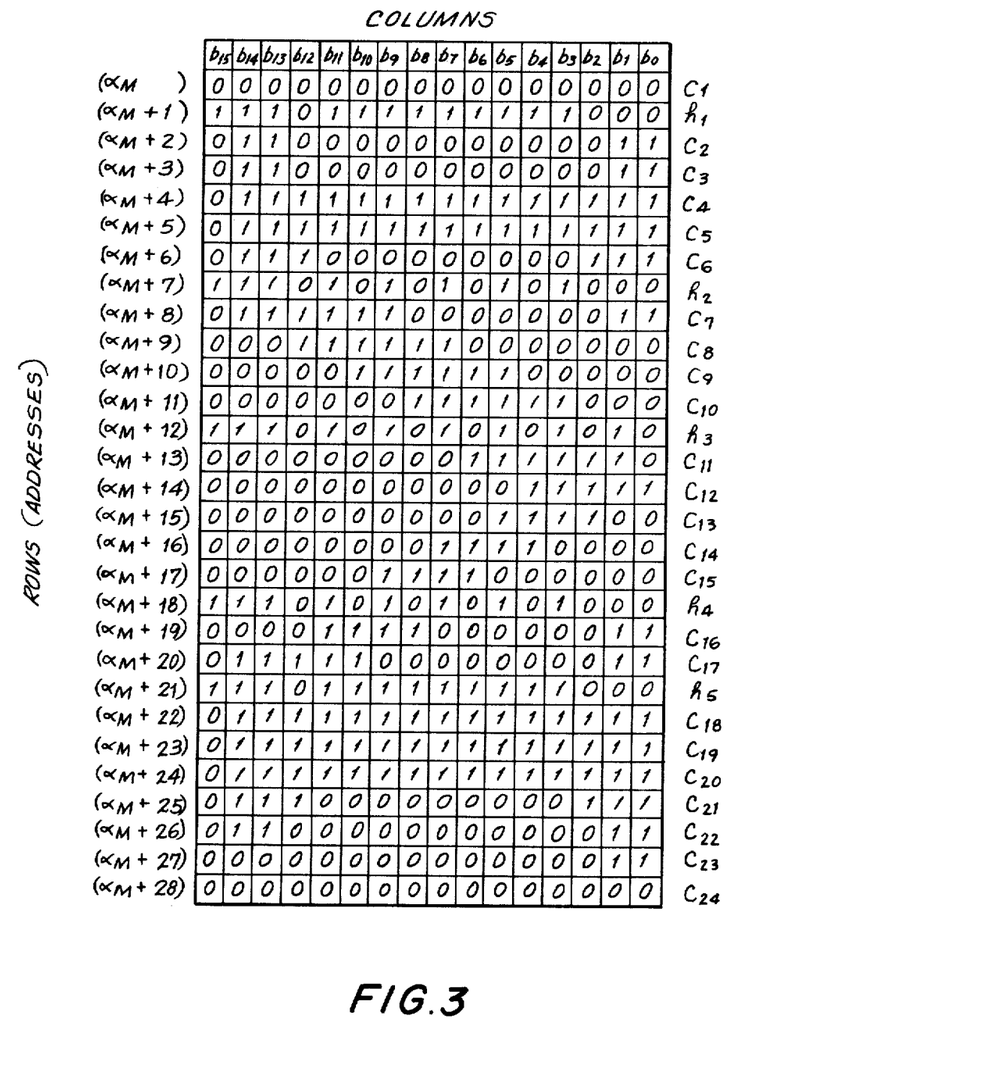
FIG. 3 is table specifying data bits stored in a memory including dot position data and shift instructions corresponding to the patterns of FIGS. 2a and 2b.

FIG. 3 is a diagram showing the actual memory contents in the case where the information of FIGS. 2a and 2b is stored in binary format. In FIG. 3, the values (aM+i), where i=0 to 28 in integers, are addresses corresponding to matrix column and inter-column positions. And, $b_j$, where j=0 to 15 in integers, corresponds to the dot rows, respectively. Therefore, coordinates (aM+i) and $b_j$ can define address locations in the memory for a dot. Each row in FIG. 3, that is, each address, contains a 16-bit word. The bits in the first and last addresses are all zeros to define a space between adjacent characters. It should be apparent that vertical columns in FIG. 3 relate to the horizontal rows of FIG. 2.

It should also be noted that a signal is necessary to distinguish between character pattern bits and the half-shift instruction bits when reading the data in an address. In this example, the first column (FIG. 3) is used as a code bit for the signal. That is, when the bit $b_{15}$ for an address row is zero, the address row contains dot data, and when the bit $b_{15}$ is 1, half-shift instructions are present at that address. Thus, instruction bits can be located at any selected address in the 29 row memory matrix depending upon the character to be printed.

In FIG. 3, αM denotes the initial address of the data of letter M. $C_k$, where k=1 to 24 in integers, denotes the character pattern in the k-th row, and $h_l$ where l=1 to 5 in integers, denotes the l-th half-shift instruction.

In printing a complete letter, the addresses αM+i are selected in sequence, and the 16 bit words in each address are read out in parallel. Each bit $b_j$ controls a corresponding row in the dot matrix (FIG. 1), except, as stated above, that bit $b_{15}$ denotes instructions for normal or half shifted dots. These instructions $h_1 \ldots h_5$ are distributed at addresses αM+1; αM+7; αM+12; αM+18; αM+21 respectively, corresponding to inter-column positions a, b, c, d, e respectively in FIG. 2a.

Figure 4:
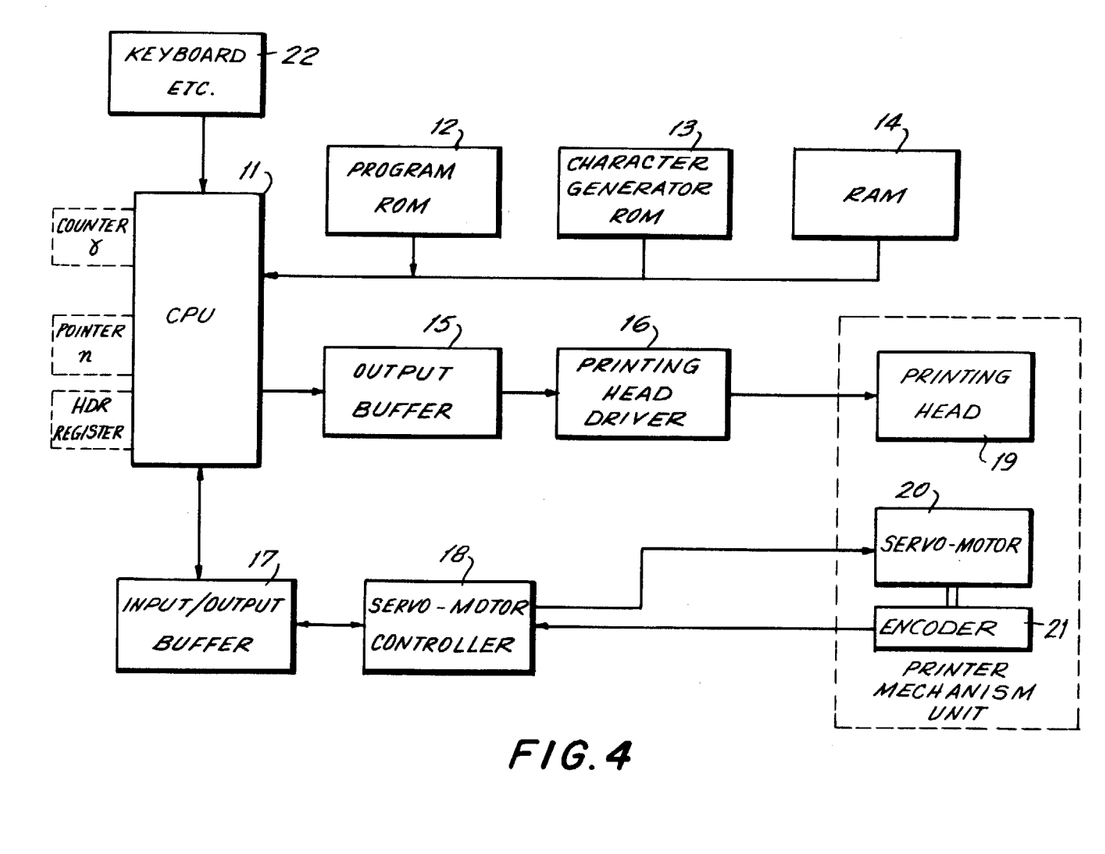
FIG. 4 is a schematic block diagram of an elemental apparatus for forming characters using memory contents as shown in FIG. 3.

FIG. 4 is a general circuit diagram of an apparatus for printing the characters from the data stored in the memory. The circuit includes a central processing unit (CPU) 11, a programmable read-only memory (PROM) 12, a character generator read-only memory (CROM) 13, a read-write random access memory (RAM) 14, an output buffer 15, a printing head driver 16, an input/output buffer 17, a servo-motor controller 18, a printing head 19, a servo-motor 20, an encoder 21 and a keyboard 22 used for controlling a printer mechanism unit. The CPU 11 is preferably a 16-bit microprocessor which is controlled by a program stored in the PROM 12. The character generator read-only memory (CROM) 13 contains a plurality of different character dot patterns such as depicted in FIG. 3. The RAM 14 is capable of storing various instructions, such as character selections, printing conditions, etc. The circuit further includes the output buffer 15 for storing printing signals from the CPU and transmitting these printing signals to a printing head-driver 16 which supplies electric signals for driving a printing head 19 in accordance with these printing signals and a trigger signal. An input/output buffer 17 couples a servo-motor controller 18 to the CPU. The servo-motor controller 18 includes a motor driver for operating a servo-motor 20 which shifts the printing head 19 to a desired position in a forward or reverse direction or stops the printing head 19 in accordance with a signal from the CPU. The servo-motor controller 18 shapes the output of an encoder 21 associated with the servo-motor 20 to convert a rotation signal output of the servo-motor 20 into a pulse signal and sends a signal representing the rotational direction of the servo-motor to the CPU. The printing head 19, the servo-motor 20 and the encoder 21 constitute a printer unit.

Figure 5:
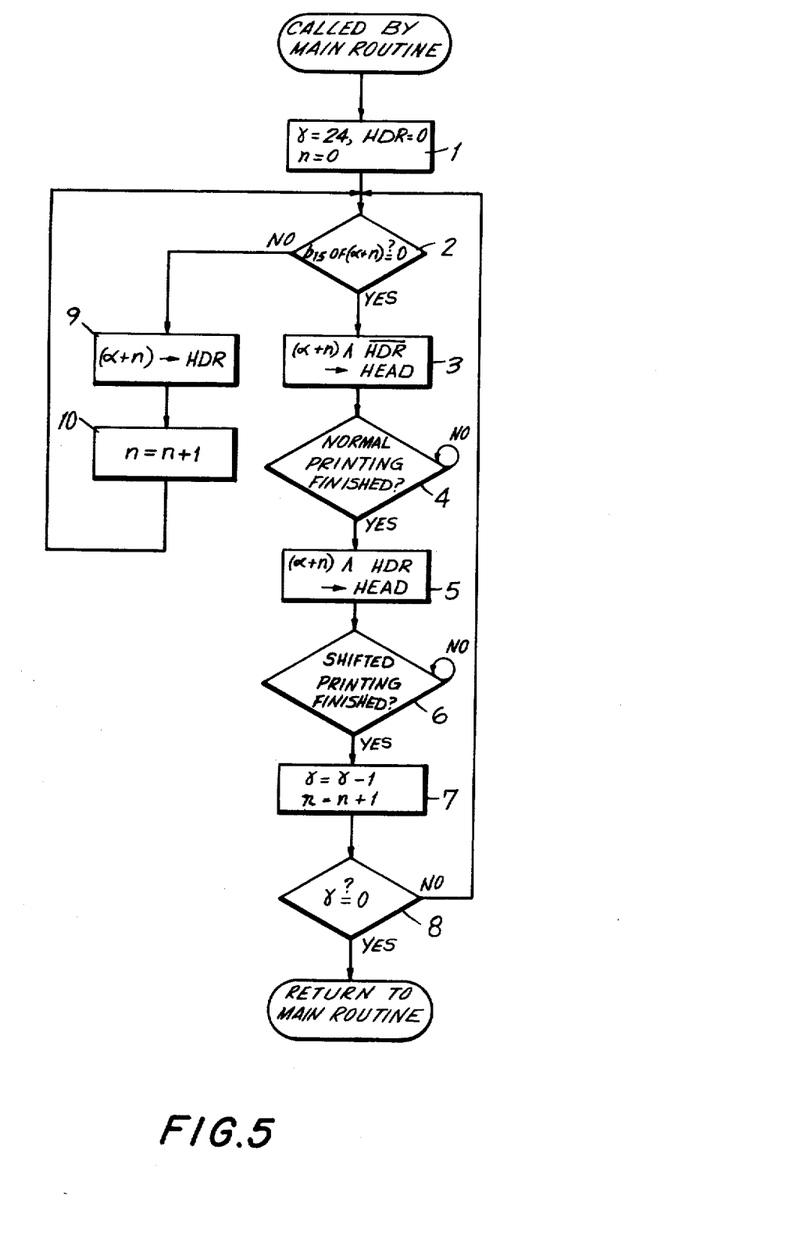
FIG. 5 is a flow chart showing operations of the printing apparatus of FIG. 4.

FIG. 5 shows a flow chart of a process used to form a desired letter from binary signals read from the character generator memory CROM 13. A counter and a pointer are associated with the CPU 11 to count the row number for printing and to indicate the distance n from the initial address $α_M$ of the ROM 13, respectively. A half-shift designating register HDR also cooperates with the CPU in determining whether or not the printing information in each row (FIG. 3) is to be sent to the printing head directly or be half-shifted for printing.

When the process of the flow chart is called by a main routine to print a selected character, the register HDR is cleared and scanning of the memory ROM 13 is started with print row number γ=24, and at the first address $α_M$ as shown in block 1 (FIG. 5). The process steps proceed toward γ=0 and $α_M$+28. For any address ($α_M$+n), the bit $b_{15}$ is checked (block 2) to determine whether $b_{15}$ is 0. An 0 indicates that the operation corresponding to that address is for printing based on dot information.

If it is determined (block 2) that the bit $b_{15}$ at the address $α_M$+n is not 0 but is 1, this indicates that the address contains half-shift data. Then the 15 bit word (not including bit $b_{15}$) at the address $α_M$+n is transferred to the HDR register and written (block 9). The address $α_M$+n is then shifted by 1 to $α_M$+(n+1) by the pointer n (block 10). When the bit $b_{15}$ at the address ($α_M$+n) is 0, which indicates that the word corresponding thereto is dot data (and not half-shift instruction data), logical products are performed on the remaining 15 bits at the address $α_M$+(n+1) and inverted 15 bits $\overline{HDR}$, respectively from the HDR register stored previously for the address $α_M$+n. The results are sent to the printing head 19 to print the normal dots directly (block 3).

Describing this operation specifically with reference to the example of FIG. 3, the address $α_M$ is initially designated by a pointer n and the content HDR of the register HDR is set at 0 (block 1). The bit $b_{15}$ is first checked (block 2) as to whether or not $b_{15}$ is 0. Since the bit $b_{15}$ at the address $α_M$ is 0, the word at that address is ANDed (logical product) with the inverted content $\overline{HDR}$ of the register HDR, which is a series of 1's in this case, and the result, which is here 0, is transmitted through the output buffer 15 and printing head driver 16 to the printing head 19 (block 3). In this case, there is no actual printing because the result of the AND operation is 0. Then, the word at the address $α_M$ (all zeros) is ANDed with HDR (all zeros) and the result (all zeros) is transmitted similarly to the printing head 19 (block 5). This operation also causes no actual printing. Then, the row number γ is reduced by 1 and the pointer n is advanced by 1 to ($α_M$+1) (blocks 7,8) and the above procedures are repeated.

Since (FIG. 3) the bit $b_{15}$ at the address $α_M$+1 is 1, the remaining 15 bit word content (1 1 0 1 1 1 1 1 1 1 1 0 0 0) of that address is shifted to the half-shift designating register HDR and stored therein (block 9). The pointer n is then advanced to $α_M$+2 (block 10). Next, a check of the bit $b_{15}$ at the address $α_M$+2 is performed (block 2). Since the bit $b_{15}$ at that address is 0, the word content remainder of fifteen bits (1 1 0 0 0 0 0 0 0 0 0 0 0 1 1) of that address is ANDed with an inversion ($\overline{HDR}$), that is, 0 0 1 0 0 0 0 0 0 0 0 0 1 1 1 of the content stored in the register HDR, and the result (0 0 0 0 0 0 0 0 0 0 0 0 0 1 1) is sent to the printing head 19 (block 3) to print the two normal dots, col. 2 in the last rows 15, 16 (FIG. 1). Then, it is checked whether normal dot printing is completed or not (block 4). The above operations carried out in the CPU 11 and by the printing system 15-21 (FIG. 4) substantially simultaneously print all of the normal dots in the column (FIG. 1) corresponding to a given address or row in the memory (FIG. 3).

When the printing of each normal dot is completed, the word content of that address is ANDed with the content (HDR) of the register and the result (1 1 0 0 0 0 0 0 0 0 0 0 0 0 0) is sent to the printing head 19 to print simultaneously the two half-shifted dots (block 5). After completion of the half-shifted dot printing is confirmed (block 6), the row number $\gamma$ is reduced by 1 to 22 and the pointer n is advanced by 1 to $a_M+3$ (block 7). Then the row number is checked to determine whether it is 0 (block 8). Note that 24 rows in the memory (FIG. 3) contain character dot data.

Since the row number is 22 and not yet 0, the procedure is repeated for the address $a_M+3$. In this manner, the operations for the addresses $a_M+2$ to $a_M+6$ are performed under the control of the half-shift designating data in the HDR register obtained and stored at the address $a_M+1$. Operations for the addresses $a_M+8$ to $a_M+11$ are performed under control of the data stored at the address $a_M+7$, and so forth until the row number $\gamma$ reaches 0. When the row number reaches 0, the printing of the character, namely, 24 columns (FIG. 1), is completed.

Figure 2C:
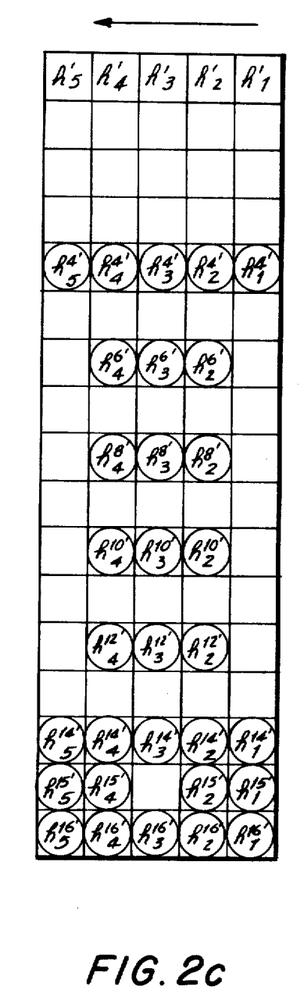
FIG. 2c is a diagram showing further half-shift instructions operating on the dot patterns in FIG. 2a to form the capital letter M in FIG. 1 from an opposite direction.

The present invention has been described hereinabove with regard to printing of a character from left to right. To improve the printing speed, bi-directional printing is preferred. To form a character in the pattern of FIG. 1 from that of FIG. 2a, dots $H_j$ in FIG. 2a are shifted rightwardly as described above. When printing from right to left using the pattern in FIG. 2a, the pattern in FIG. 1 can be obtained by shifting dots $N_j$ rearwardly. In this case, the pattern to be formed does not coincide precisely with the pattern of FIG. 1 in that this process yields the pattern of FIG. 1 shifted by $\frac{1}{2}$ dot spaced to be left in its entirety. However, the relative positions between adjacent dots are the same as that in FIG. 1 so that by adjusting the print start position, the pattern of FIG. 1 can be printed at the desired location. In this case, half-shift instructions for five rows specifying which dots are to be shifted to the left are necessary as in the previous embodiment. FIG. 2c shows the half-shift instructions in this case. $h_1'$, $h_2'$, $h_3'$, $h_4'$, and $h_5'$ in FIG. 2c are complements of representative instructions $h_5$, $h_4$, $h_3$, $h_2$ and $h_1$ in FIG. 2b. That is, with the exception of the first row, half-shift instructions occur in FIG. 2c where they were absent in FIG. 2b. The reverse printing instructions $h_1'-h_5'$ are inserted into positions $a'-e'$ shown in FIG. 2a together with the insertion of the forward printing information in FIG. 2b. The positions b and e', for example, are substantially the same in FIG. 2a.

FIG. 6 is a table showing data stored in a memory in which all of the data in FIGS. 2a to 2c is stored in digital form in the same way as previously described. It should be noted that position e' is slightly to the left of b (FIG. 2a). In other words, in this example, the address number corresponding to e' is lower by 1, where $h_5'$ is stored, than the address number corresponding to b where $h_2$ data is stored. This is because, in accordance with the present invention, the previous half-shift instruction remains in effect until the next succeeding half-shift instruction is encountered. Accordingly, where half-shift instructions are to be juxtaposed for purposes of bi-directional printing, the half-shift instruction for a leftward shift must be positioned at a lower address number than that for a rightward shift.

Then in printing from left to right, for example, the data from address $a_M+8$ will replace the data from address $a_M+7$ in the HDR register before any dot printing occurs as a result of the data in the address $a_M+9$. In printing from right to left, that is, backwards, the $a_M+7$ address data replaces the $a_M+8$ data prior to printing the dots represented in address $a_M+6$.

Figure 7:
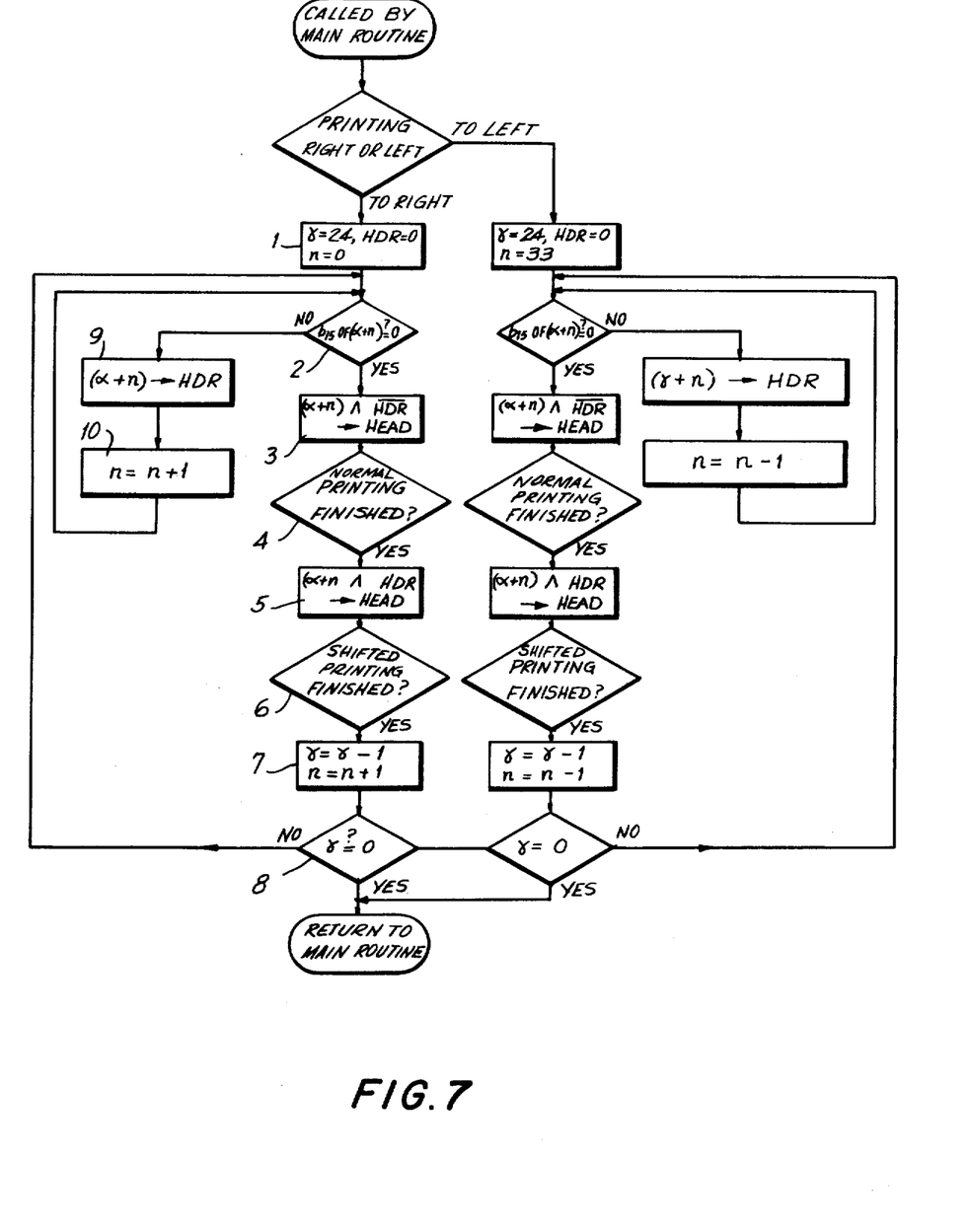
FIG. 7 is a flow chart for performing a letter forming operation with the memory contents specified in FIG. 6.

The process of printing data shown in the flow chart of FIG. 7 is basically the same as in the first example illustrated in the flow chart in FIG. 4. When printing from right to left, the data in the memory should be read in the reverse direction, that is, from the high numbered addresses to the lower numbered addresses. Therefore, before setting the counter $\gamma$, the pointer n and the HDR (block 1), the printing direction must be determined. When the printing is from right to left, the processing occurs according to FIG. 7. When the printing is from right to left, the address n=0 is changed to "n=33", and "n=n+1" in blocks 7 and 10 is changed to "n=n−1". It should be understood that n=33 is applicable to the example of the letter M of FIG. 1 and FIGS. 6 and 7. The value of n depends on the character to be printed from right to left.

Figure 8:
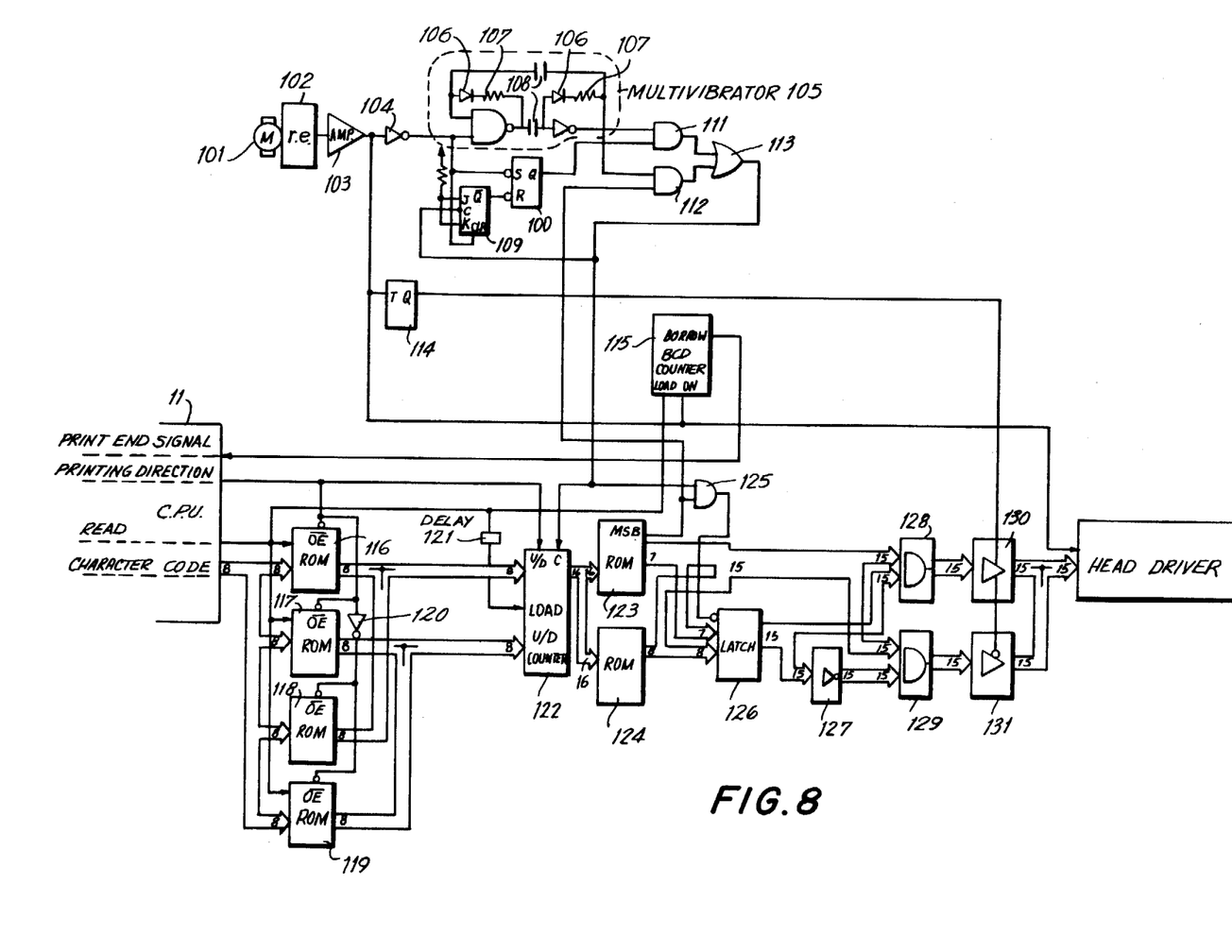
FIG. 8 is a circuit for dot matrix printing in accordance with this invention.

A circuit for bi-directional printing of a character, for example, capital letter M, is described using FIG. 8. A motor 101 advances a carriage whereon the head of a printer is mounted. A rotary encoder 102 senses the rotation of the motor and outputs psuedo-sine waves and outputs digital signals. The digital signals serve in timing of the printing. As described previously, data for forming dot characters, symbols, etc. is stored in memory from the far left row preceding to the right in a sequence of address numbers for each character, symbol, etc. Half shift instruction patterns are also contained at different memory addresses. Therefore, at first, it is necessary to clearly state the initial address, that is, $a_M$ when prining from left to right, and $a_M+33$ when printing from right to left as shown in FIG. 6. ROMs 116,117 are for rightward printing and ROMs 118,119 are for leftward printing. ROMs 116,118 are for upper bytes and ROMS 117,119 are for lower bytes. The codes and read signals corresponding to the letter M to be printed, and signals corresponding to the printing direction, for example, a rightward printing signal is low level and a leftward printing signal is high level, are inputted to each ROM from a CPU 11 which controls the system. For rightward printing, a low level signal is inputted to the output enable terminal of ROMs 116,117 and a high level signal, inverted to the inverter 120, is inputted to the output enable terminal of ROMs 118,119. The output of ROMs 118,119 becomes a high impedance. Output of ROMs 116,117, that is, the value of $a_M$, is transmitted to the 16 bits up down counter 122 as a signal of 16 bits.

For leftward printing, a high level signal is inputted to the output enable termainal of ROMs 116,117 and low level signal inverted in the inverter 120 is inputted to the output enable terminals of ROMs 118,119. The output of ROMs 116,117 becomes a high impedance. From the output of ROMs 118,119, the value of $a_M+33$, is transmitted to the 16 bit up down counter 122. A read signal is inputted to the load terminal of the 16 bit counter 122 through the delay circuit 121 and an output signal of 16 bits at this time serves as an address for ROMs 123,124 of 64 K bytes, wherein the character pattern data is stored as shown in FIG. 6. ROM 123 is for upper bytes of data and ROM 124 is for lower bytes. In this data, the character, symbol, etc., dot pattern data indicated by $C_i$, the rightward half-shift instruction pattern data indicated by $h_i$, and the leftward half-shift instruction pattern data indicated by $h_i'$ are mixed as described above. The character dot pattern data and the rightward or leftward half-shift instruction patterns are distinguished one from another at the far upper bit of each 16 bit data word, that is, at the level of the MSB (Most Significant Bit) ($b_{15}$). For example in FIG. 6 as previously described, if MSB is 0, it indicates character dot pattern data and a 1 indicates a shifted dot instruction pattern. Consequently, when the data read at ROMs 123,124 is a half-shift instruction pattern, the data is stored in latch circuit 126 while the character pattern dot data is read. In other words, if the MSB of ROM 123 is 1, the counter 122 is advanced until the MSB is 0. The address transmitted to ROMs 123,124 is incremented (advanced) for rightward printing and the address is decremented (lowered) for leftward printing.

Control of the clock signals inputted to the counter 122 is now explained. Digitized signals from the rotary encoder 102 are inputed to an astable multivibrator circuit 105 through an amplifier 103 and inverter 104. This circuit 105 includes a gate, an inverter, switch diodes 106, fixed resistances 107 and capacitors 108. When the output of the inverter 104 is at a high level, that is, when the digitized output of the rotary encoder is at a low level, the circuit oscillates. The oscilliating frequency is regulated by varying the capacity of the capacitors 8 and set approximately to a value of ten times the output frequency of the rotary encoder 102 corresponding to the full motor 101 rotating speed. Output of the astable multivibrator circuit 105 serves as a clock for the 16 bit counter 122. However, a clock signal is needed only when the MSB of ROM 22 is 1. After the MSB of ROM 22 goes to 0, the clock is not input to the bit counter 122 until the digitized signal of the rotary encoder 102 goes to a low level. This operation is accomplished by using the flip flop 109, the RS flip flop 110, the AND gates 111,112 and the OR gate 113. When output of the inverter 104 is low, the JK flip flop 109 is cleared, and output $\overline{Q}$ goes to a high level. The S input of the RS flip flop 110 is low, the R input is high and output Q is high. In this condition, if the output of the inverter 104, goes to a high level, the S input of the RS flip flop 110 is high. However, output Q is also high as the R input remains high. Thus, one input of the AND gate 111 is high.

On the other hand, when the output of the inverter 104 goes to a high level, the astable multivibrator circuit 105 starts to oscillate simultaneously and the oscillator output is inputted into the OR gate 113 through the AND gate 111. In this condition, regardless of the output of the AND gate 112, having at one input the MSB of ROM 23, the output of the astable multivibrator circuit 105 appear at the output of the OR gate 113. This output becomes a clock and consequently the input address of ROMs 123,124 is incremented for rightward printing and is decremented for leftward printing. At the same time output of the OR gate 113 is inputted to the clock terminal of the JK flip flop 109 and output $\overline{Q}$ is inverted to a low level and the RS flip flop 110 is reset. Then output Q of the RS flip flop 110 goes to a low level and the output of the AND gate 111 is fixed at a low level. In other words, the AND gate 111 passes the output pulse of the astable multivibrator circuit 105 through once. After that, if the MSB of ROM 123 is 1, the output pulse of the astable multivibrator circuit 105 is passed through the AND gate 112. If the data indicating MSB of ROM 123 is 0, that is the character dot pattern data is to be read, output of the AND gate 112 and output of the OR gate 113 go to a low level and supplying a clock signal to the 16 bit counter 122 is stopped.

When the data read from ROMs 123,124 is half-shift instruction data, the data is latched by the latch circuit 126 at the trailing edge of output pulse of the astable multivibrator circuit 105 which passes through the AND gate 125. Latch 126 performs the functions equivalent to the HDR register in the simplified circuit of FIG. 4. When the data is character dot pattern data, the data is not latched and is transmitted to the AND gates 128,129, because one input of AND gate 125 is at a low level and the output pulse of the astable multivibrator circuit 105 does not pass.

The value of the product of the data read from ROMs 123,124 and the output of the latch circuit 126 is taken at the AND gate 128. The value of the product of the data read from ROMs 123,124 and the output of the latch circuit 126, inverted by the inverter 127, is taken at the AND gate 129. The output of the AND gate 128 is connected to a tristate buffer 130 and the output of the AND gate 129 is connected to a tristate buffer 131. To the control inputs of the two tristate buffers 130,131 the digitized output of the rotary encoder 102, divided to ½ frequency by the T flip flop 114, is applied. In the tristate buffer 130, when the control input is at a high level, the output signal is equal to the input signal. When the control input is at a low level, the output is at a high impedance state. To the contrary, in the tristate buffer 131, the logic at the control input is inverted. That is, the output of the AND gate 128 and the output of the AND gate 129 pass through the tristate buffers 130,131 alternately. At normal dot timing, the output of the AND gate 128, the value of the logical product of a character dot pattern data and a half-shift instruction pattern data, is outputted and transmitted to the driver circuit of the print head. At half-shift dot timing, the output of AND gate 129, the value of the logical product of character dot pattern data and an inverted half-shift instruction pattern data, is outputted and transmitted to the drive circuit of the print head. Thereby information for the desired character, sign, etc. is obtained. As printing is performed to the timing of digitized output signals of the rotary encoder 102, the signal is also transmitted to the drive circuit of the print head. As such reading of data is finished when one character is printed, the counter 115 detects whether printing is finished or not. The counter 115 starts to count the output signal of the rotary encoder 102 which is digitized by a read signal from the CPU. For example, in a capital letter M, when the counter output is 24, equal to the number of matrix columns, the counter 115 outputs a signal indicating the end of printing of one character and informs the CPU. By a series of the above described motions, the reading of data to display the characters or symbols is performed. The numbers written with the large arrows in FIG. 8 represent the numbers of bits on each signal line.

Although shifting by ½d of dots to the right or left of the matrix column positions has been described above, it should be understood that in an alternative embodiment, and to form other characters or character shapes, the shift distance need not be limited to d/2.

It will thus be seen that the objects set forth above, among those made apparent from the preceeding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A printer for printing characters in a matrix pattern of m×n dots, comprising:
   character data arranged in m rows×n columns;
   first memory means for storing said character data, said first memory means having at least the same number of addresses as the number n of said columns, each said address including bits corresponding in number to said rows;
   u half-shift instructions for shifting selected dots in printed characters, said half-shift instructions being included in designated columns between the columns comprising said character data, said half-shift instructions respectively being stored in a different address immediately preceding the address of columns in said first memory means including data of dots to be shifted, said half-shift instructions including as many bits as said bits in each said data storage address;
   means for distinguishing between the state of a first key bit of each address in said first memory means, said first key bit indicating when the data stored in the associated address is said character data or one said half-shift instruction;
   reading means for reading out said character data and said half-shift instructions in a first sequence from said addresses of said first memory means, and
   printing means for printing said characters in response to data from said means for reading out.

2. The printer of claim 1 wherein said shifted dot positions are half-shifted and located between adjacent columns in said matrix.

3. The printer of claim 1 or 10 wherein at least one of said half-shift instructions control a plurality of dots at sequentially printed column positions.

4. The printer of claim 3 wherein said half-shift instructions are stored in first memory locations interleaved with first memory locations at which said character data is stored, and said printer is adapted to read said first memory locations in consecutive order.

5. The printer of claim 10, wherein said printer substantially simultaneously prints dots for an entire column.

6. The printer of claim 3, wherein said printer substantially simultaneously prints dots for an entire column.

7. The printer of claim 4, wherein said printer substantially simultaneously prints dots for an entire column.

8. The printer of claim 3 and further comprising
   a central processing unit and second memory means containing programs for reading data out of said first memory means, being coupled to said central processing unit;
   said printing means comprising a printing head coupled to said central processing unit through a printing head driver, a servo-motor and an encoder, said servo-motor being adapted to operate in accordance with outputs of said encoder, a servo-motor controller, said servo-motor controller being coupled to said servo-motor and said encoder for controlling operations thereof, said central processing unit being coupled to said servo-motor controller.

9. The printer of claim 8, wherein said first and second memory means are read-only memories.

10. A printer as claimed in claim 1, wherein said printing means prints while moving across a recording sheet in a first direction and in a second direction opposite to said first direction, and further comprising:
    detecting means for detecting the moving direction of said means for printing,
    the number of said half-shift instructions being divided into two portions, a first portion of said half-shift instructions determining the shifting of dots in accordance with motion of said printing means in said first direction and the second portion of said half-shift instructions determining the shifting of bits in accordance with the motion of said printing means in said second direction;
    and a second key data bit in each said address, said first key data bit indicating whether said column in said first memory means included either half-shift instructions or character data when said printing means moves in said first direction, the other said key data bit indicating whether said address contains either half-shift instructions or character data when said printing means moves in the second direction, said reading means reading out said character data and said half-shift instructions of said first portion of said half-shift instructions in said first sequence when said printing means moves in said first direction and said character data and said second portion of said half shift instructions in a second sequence opposite to said first sequence when said printing means moves in said second direction.

11. The printer as claimed in claim 1 or 10, wherein said reading means comprise:
    a central processing unit connected to said first memory means;
    second memory means coupled to said central processing unit and containing programs for reading out data from said first memory means.

12. The printer of claim 1 or 10 wherein u is not less than 2, and less then m.

13. The printer of claim 10, wherein said first key bit is the first bit in each said address and said second key bit is the last bit in each said address.

14. The printer of claim 10, wherein each half-shift instruction of the first portion is in an address adjacent to another half-shift instruction of the second portion.

15. The printer of claim 14, wherein the number of half-shift instructions is equal in each portion.

16. The printer of claim 11 includes a printing head coupled to said central processing unit through a printing head driver, a servo-motor and an encoder, said servo-motor being adapted to operate in accordance with outputs of said encoder, a servo-motor controller, said servo-motor controller being coupled to said servo-motor and said encoder for controlling operations thereof, said central processing unit being coupled to said servo-motor controller.

17. The printer of claim 10, wherein rows shifted in said first direction are not shifted in said second direction.

18. The printer of claim 10 and further comprising
    central processing unit and, a second memory means, said second memory means containing programs for reading data out of said first memory means, and being coupled to said central processing unit;
    said printing means comprising a printing head coupled to said central processing unit through a printing head driver, a servo-motor and an encoder, said servo-motor being adapted to operate in accordance with outputs of said encoder, a servo-motor controller, said servo-motor controller being coupled to said servo-motor and said decoder for controlling operations thereof, said central processing unit being coupled to said servo-motor controller.

19. The printer of claim 1 or 10, wherein said first memory means is a read only memory.

20. The printer of claim 16, wherein said first and second memory means are read-only memories.

21. The printer of claim 18, wherein said first and second memory means are read-only memories.

22. The printer of claim 1 or 10 and further comprising means for storing a half-shift instruction said instruction being read from said first memory means by said means for reading out and input to said means for storing a half shift instruction.

23. The printer of claim 22 and further comprising processor means for receiving character data read from said first memory means and said half-shift instruction from said means for storing and outputting a logical product of said character data and said stored half-shift instruction, and a logical product of said character data and an inverted form of said stored half-shift instruction, said products differing and distinguishing between normal and shifted printed dots.

24. The printer of claim 23 wherein each said stored half-shift instruction is held in said means for storing until the next half-shift instruction is read from said first memory means and stored in said means for storing.

* * * * *